United States Patent [19]
Goon

[11] Patent Number: 5,775,641
[45] Date of Patent: Jul. 7, 1998

[54] AIRCRAFT CARGO PANNIER ASSEMBLY

[75] Inventor: Peter Goon, The Levels, Australia

[73] Assignee: Australian Flight Test Services Pty Ltd, Australia

[21] Appl. No.: 628,688

[22] PCT Filed: Oct. 13, 1994

[86] PCT No.: PCT/AU94/00622

§ 371 Date: Apr. 15, 1996

§ 102(e) Date: Apr. 15, 1996

[87] PCT Pub. No.: WO95/10449

PCT Pub. Date: Apr. 20, 1995

[30] Foreign Application Priority Data

Oct. 15, 1993 [AU] Australia ................ PM1825

[51] Int. Cl.$^6$ .............. B64D 1/10; B64C 1/20; F41F 3/042

[52] U.S. Cl. ............... 244/118.1; 244/137.1; 248/316.8; 89/1.801

[58] Field of Search .............. 244/118.1, 137.1, 244/129.4; 248/316.8; 89/1.801, 1.802, 1.804

[56] References Cited

U.S. PATENT DOCUMENTS

| | | | |
|---|---|---|---|
| 2,472,947 | 6/1949 | Hlobil | 244/118.1 |
| 2,950,073 | 8/1960 | McLain et al. | 244/137.1 |
| 2,950,791 | 8/1960 | Babcock | 244/137.1 |
| 3,026,071 | 3/1962 | Barcellona et al. | 244/137.1 |
| 3,028,130 | 4/1962 | Burton | 244/137.1 |
| 3,463,334 | 8/1969 | Blakely et al. | 244/137.1 |
| 3,552,587 | 1/1971 | Warren | 244/137.1 |
| 3,899,092 | 8/1975 | Nordstrom | 244/137.1 |
| 3,952,974 | 4/1976 | Lang | 244/137.1 |
| 4,208,949 | 6/1980 | Boilsen | 89/1.801 |
| 4,858,855 | 8/1989 | Dalbera | 244/137.1 |

FOREIGN PATENT DOCUMENTS 501302  3/1939  United Kingdom.

OTHER PUBLICATIONS

Derwent Soviet Inventions Illustrated, vol. V, issue 7, issued 21 Mar. 1974, Road Vehicles, Ships, Aircraft, Railways, p. 2, SU 380536 (Balykin et al.), 30 Aug. 1973, abstract.

Derwent Soviet Inventions Illustrated, Section 3, Mechanical and General, issued 4 May 1967, Road Vehicles, Ships, Aircraft, Railways, SU 195895 (Rakhilin et al.), 20 Feb. 1970.

*Primary Examiner*—V. Lissi Mojica
*Attorney, Agent, or Firm*—Klauber & Jackson

[57] ABSTRACT

An aircraft cargo and/or equipment pannier system for an aircraft having a weapons bay in its fuselage, the pannier system including a container chassis having a pair of spaced apart beam attachment mountings for suspending the chassis from the ceiling of the weapons bay with a pair of spaced apart cross beams, and an upper support frame assembly which is releasably secured to and interconnects the cross beams. When the cross beams are attached to the container chassis, the cross beams are housed essentially within the confines of the container chassis.

22 Claims, 6 Drawing Sheets

FIG 10

AIRCRAFT CARGO PANNIER ASSEMBLY

This invention relates to an improved container storage system for an aircraft, and in particular to a cargo pannier assembly which is designed to be suspended within the fuselage of an aircraft having a longitudinally extending weapons bay which opens downwardly.

A number of existing cargo pannier systems are known to the applicant. One system, known as the P3 Pannier used by the Royal Australian Air Force for its P3 Orion aircraft, has a number of problems or deficiencies associated therewith. This pannier type is an open top, rectangular box of welded steel frame construction with a plywood floor and steel angles forming the side rails and removable gates for the ends. It has a limited volumetric capacity, in the order of 50 cubic feet, and limited load capacity (in the order of 800 pounds), and being of an open frame construction, the pannier has limited containment capability and requires the use of individual restraints (tie-down straps) to secure the cargo being carried.

The limited load carrying capacity of the P3 Pannier is due in part to the limitations on the suspension system which is used for attaching the pannier to the aircraft. The P3 Pannier is attached to the aircraft via the weapons pylons (stores suspension system) in the weapons bay of the aircraft. This form of attachment has several drawbacks including the need to use special trade skills (armament technicians) to install and remove the unit, and to carry out the necessary armament system checks. In addition, to gain usable space within the pannier, the standard pylon configuration must be changed by the removal of two of the dual pylon racks. These racks must then be carried either in the aircraft cabin or in the pannier itself to enable the aircraft to be reconfigured to normal operational status (four pylons) with the pannier removed. The means for carrying these pylon racks significantly reduces the effective cargo space available in the aircraft.

The existing steel framed pannier unit has an empty weight of approximately 150 kgs while another known aluminium frame version of the P3 unit weighs approximately 120 kgs. The existing versions of the pannier are loaded empty into the aircraft weapons bay with the assistance of a bomb loader, or when a bomb loader is not available, loading is effected manually by up to eight personnel. It is desirable therefore that the empty weight of the pannier system be reduced, as a means of reducing the effort required and difficulty involved in manual loading of the unit, and of minimising the effect of the pannier installation on aircraft payload.

During installation of the existing P3 Pannier, its positioning and subsequent attachment within the weapons bay of the aircraft, even with the assistance of a bomb loader unit, is unnecessarily difficult. The need to manually adjust the position of the pannier while holding the bomb rack sway braces open is an undesirable feature of the unit. The height of the pannier floor above the tarmac and the limited crawl space available to gain access to the suspension points for securing the four sway braces onto the existing panniers are considered undesirable features. Still further, the proximity of the ceiling of the weapons bay and its associated hardware, eg power outlets, wiring routing etc, presents a hazard to loading personnel carrying out the securing (and, later, cargo loading) operations.

A still further problem is that associated with its cargo restraint system. Such a system utilises separate cargo straps of varying lengths and types. The straps are either anchored (tied) to the side frames of the pannier and tensioned over the cargo or looped around the pannier and the cargo, then tensioned. Though offering some level of flexibility, this method of restraint does not provide any form of containment in the event of an item of cargo opening or breaking free, is considered to be too subjective and requires the use of separate equipment (ie several tie-down straps) which may be misplaced on deployment.

It is the main object of the present invention to provide an improved cargo and/or equipment pannier system for an aircraft which obviates at least some of the aforesaid prior art problems, and in particular, one which is simple to install and easy to load.

It is another object of the present invention to provide an improved aircraft cargo and/or equipment pannier system which is adapted for suspension within the weapons bay of the aircraft, being independent of its weapons pylon system, thus obviating the need to reconfigure the pylons in the weapons bay each time the pannier is carried.

It is a still further object of the present invention to provide an improved cargo and/or equipment pannier unit which is equipped with an integral restraint system for securing cargo and/or equipment loaded within the pannier.

A still further object of the present invention is to provide a cargo and/or equipment pannier assembly having a chassis which is designed to maximise the volumetric capacity of the system, and which provides for carriage of any removed pylons by means of pylon fastening points provided on its outer walls.

It is a still further object of the present invention to provide an improved aircraft cargo and/or equipment pannier system having a chassis which is of lightweight construction, whilst at the same time having the required levels of strength and robustness.

Broadly according to this invention therefore, an improved aircraft cargo and/or equipment pannier system comprises:

- a container chassis having a pair of opposite side walls, a pair of opposite end walls, a bottom wall and an open top, which, in the case of an equipment pannier is closed by a lid, each said side wall being provided near its upper edge with a pair of longitudinally spaced apart cross beam attachment points, the attachment points on one of the side walls being transversely aligned with the corresponding attachment points on the other side wall,

- a pair of longitudinally spaced apart rigid cross beams, each extending between and having its opposite ends releasably attached to respective said attachment points on said side walls, said cross beams, when attached, being housed essentially within the confines of the container chassis,

- an upper support frame assembly bridging said cross beams,

- a plurality of releasable securing means for releasably securing the support frame at mutually spaced locations to said cross beams near the ends thereof, and

- mutually spaced apart attachment means by which the support frame assembly can be releasably fastened to the ceiling of the weapons bay of the aircraft, via the store sway brace brackets.

Preferably the upper support frame assembly comprises a pair of separate sub-frames each having a bridging frame member and a pair of parallel spaced apart leg members extending inwardly (with respect to the container side walls) at right angles to said bridging frame member, said subframes being arranged, one to either side of the central longitudinal vertical plane of the container chassis, with the leg members of each said sub-frame, respectively, lying contiguous with and parallel to said cross beams, and the bridging frame member extending between said cross beams.

Preferably each said top support sub-frame is releasably secured to said cross beams by a pair of releasable fastening pins, each of which engages within aligned apertures formed respectively in a lug carried by the leg member intermediate the ends thereof and in the cross beam near its upper edge.

Preferably each of the sub-frames is U-shaped and is suspended from the store sway brace brackets in the ceiling of the weapons bay by means of four upstanding attachment lugs, two of which are located at or near the outer corners of the frame, the other two of which are located at the free ends of the leg members. With this arrangement the pair of top support sub-frames can be pinned to eight of the store sway brace brackets at the front and rear of the pylon well of the aircraft. The pannier assembly can thus be suspended in the aircraft via a suspension which is independent of the weapons pylons in the weapons bay of the aircraft.

The pannier assembly of the present invention can be easily and readily installed by firstly attaching the top support sub-frames to the store sway brace brackets at the front and rear of the pylon well by means of eight releasable locking pins, thereafter securing each of the cross beams to the top support frames by means of a pair of releasable locking pins, followed by lifting the unladen container chassis into position beneath the cross beams, so that the beams lie approximately centrally of the chassis and finally connecting the ends of the cross beams to the attachment or fastening points carried by the chassis side walls at or near their upper edges.

Preferably the fastening or attachment points carried by each of the chassis side walls comprise a pair of fixed, spaced apart, co-axial locking pins which extend approximately longitudinally of the chassis.

Preferably, there is provided a pair of opposite transversely aligned manually operable, releasable latch devices carried inboard of the side walls of the chassis intermediate the ends thereof for releasably locking at least one of the cross beams against translational movement in the lengthwise direction of the chassis.

Preferably each end wall of the container chassis is provided with one or more pylon attachment means on its outer surface for enabling a pylon to be releasably carried thereon. With this arrangement, those pylons (which would otherwise occupy space within the chassis) can be removed from the upper well in the ceiling of the weapons bay to provide additional space within the interior of the container chassis, while still permitting a full complement of pylons to be carried within the aircraft, and the removed pylons releasably fixed to the end walls of the chassis externally thereof.

Preferably each end wall comprises a removable door section which has the facility to carry two pylons.

Preferably the container chassis is provided with a cargo restraining net formed of flexible webbing, the net being an integral part of the chassis.

Preferably the cargo restraining net comprises a plurality of strap portions which pass through eyelets spaced along the length of each said side wall at or near its lower edge, the strap portions being anchored to respective ratchet buckles fixed on the underside of the chassis, the net being further provided with a plurality of clips spaced around its periphery for releasable connection to attachment points spaced along the length of the side walls near the upper edges thereof.

With this arrangement, when the cargo is loaded within the container chassis, the net can be tightened by tensioning each of the strap portions by means of the ratchet buckles. Preferably the cargo net is maintained in a raised position spaced above the floor of the chassis.

Preferably the container chassis is of folded sheet metal, adhesively bonded metal sandwich panel with load bearing core material, and welded steel construction.

In another embodiment of the invention, the container chassis has its open top end closed off by means of a closure lid or panel, and its end walls each being of one-piece construction. This would be desirable when the system is used for carriage of avionics equipment, such equipment being defined as operational support material capable of operating on a stand alone basis and/or interfacing with other on-board aircraft systems.

In order to more fully explain the present invention, a preferred embodiment thereof is described hereunder in some further detail with reference to and as illustrated in the accompanying drawings wherein.

Referring to the accompanying drawings, a cargo pannier assembly 10 for installation within the weapons bay B of an aircraft A (refer FIG. 7) comprises an open top rectangular container 11 having a pair of opposite side walls 12, 13, a pair of opposite end walls 15, 16 and a bottom 17.

The container 11 is suspended from the ceiling 18 of the aircraft weapons bay by means of a pair of longitudinally spaced apart transversely extending cross beams 20, 21, each of which is removably connected at its opposite ends to transversely aligned support pins 24 which are integrally fitted to the container 11 on opposite sides thereof adjacent the upper edges of the side walls 12, 13, with the cross beams 20, 21 in turn being releasably fastened to a top support frame comprising a pair of transversely spaced apart, U-shaped sub-frames 25, 26. The sub-frames 25, 26 in turn are pinned to eight of the store sway brace brackets 27 located within the pylon well of the aircraft weapons bay.

The connection of each sub-frame 25, 26 to the ceiling 18 of the weapons bay is made by means of four releasable locking pins 28 which are tethered to the frame 25, 26, each locking pin 28 engaging within aligned holes formed respectively in a channel bracket 27 and an upstanding lug 29 on the sub-frame. Each sub-frame 25, 26 has four attachment points, one near each of the two corners of the frame, and one at each of the free ends of the legs of the frame.

Figure 6:
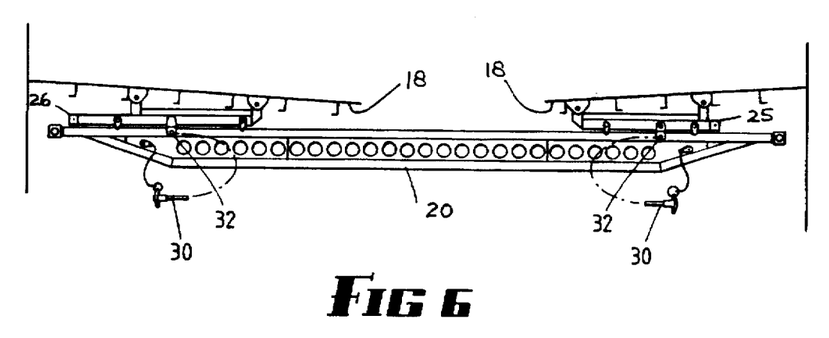
FIG. 6 is a view looking along the weapons bay of the aircraft showing the installation of the cross beam and its mode of attachment to the top support frames.

In this embodiment, the cross beams 20, 21 abut respectively against the underside of the legs of top frames extending between the cross beams. The attachment of each of the cross beams 20, 21 to the sub-frames 25, 26 is made by releasable locking pins 30 each of which passes through aligned holes 40 formed respectively in the upper chord of the cross beam 20, 21 and a depending lug 32 carried by a leg of the support frame 25, 26 intermediate the ends thereof. The pinning of the cross beams 20, 21 to the sub-frames 25, 26 is clearly shown in FIG. 6 of the drawings.

Figure 10:
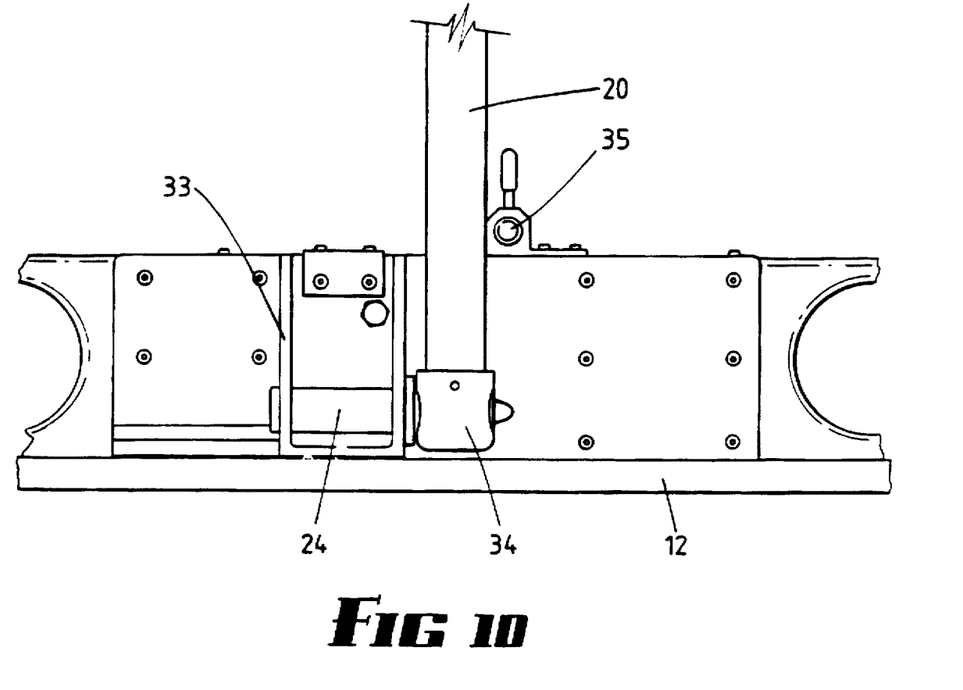
FIG. 10 is a fragmentary plan view showing the connection between an end of one of the cross beams with its attachment means carried by the side wall of the chassis inboard thereof.

The connection between the cross beams 20, 21 and the container 11 is shown in more detail in FIG. 10. Each of the longitudinally extending support pins 24 is carried by means of a fixed channel bracket 33 with the pin 24 projecting to one side thereof. Each end of each of the cross beams 20, 21 is provided with an eye socket 34 which slidably locates and houses a respective projecting portion of support pin 24. The attachment of the container 11 to the support pins 24 is achieved by lifting the container 11 into a position beneath the cross beams 20, 21 and horizontally moving the container 11 lengthwise so as to engage the pins 24 within their eye sockets 34.

The cross beam 20 is locked in position by means of a pair of manually operable latch mechanisms 35 carried on opposite sides of the container 11. With the latch mechanisms 35 in their extended locked positions, the cross beam 20 is restrained against fore and aft movement relative to the container 11, which in turn restrains the beam 21 against such movement. The cross beam 21 may also be locked in position by means of an additional pair of latch mechanisms 35 as per cross beam 20. The latch mechanisms may be operable from either inside or outside the container 11.

Figure 7:
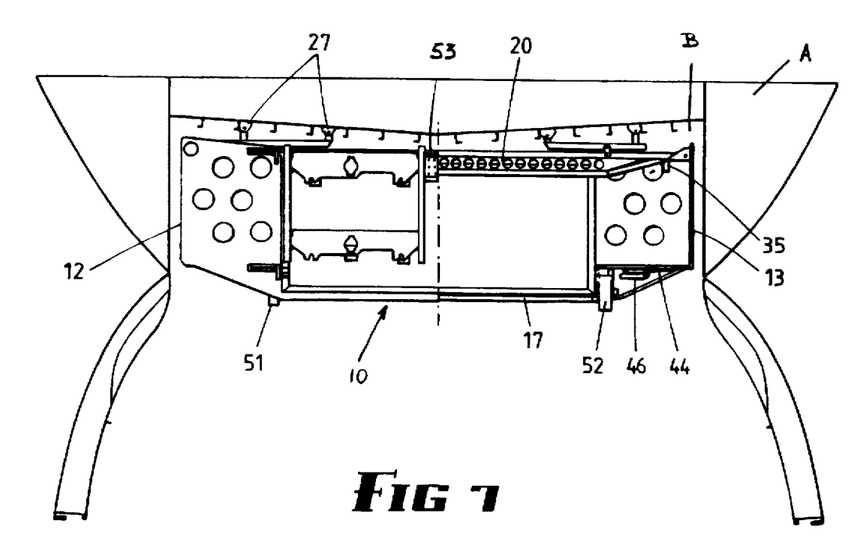
FIG. 7 is a view similar to FIG. 6 showing the container chassis (partly sectioned) installed in position suspended from the cross beams.
Figure 8:
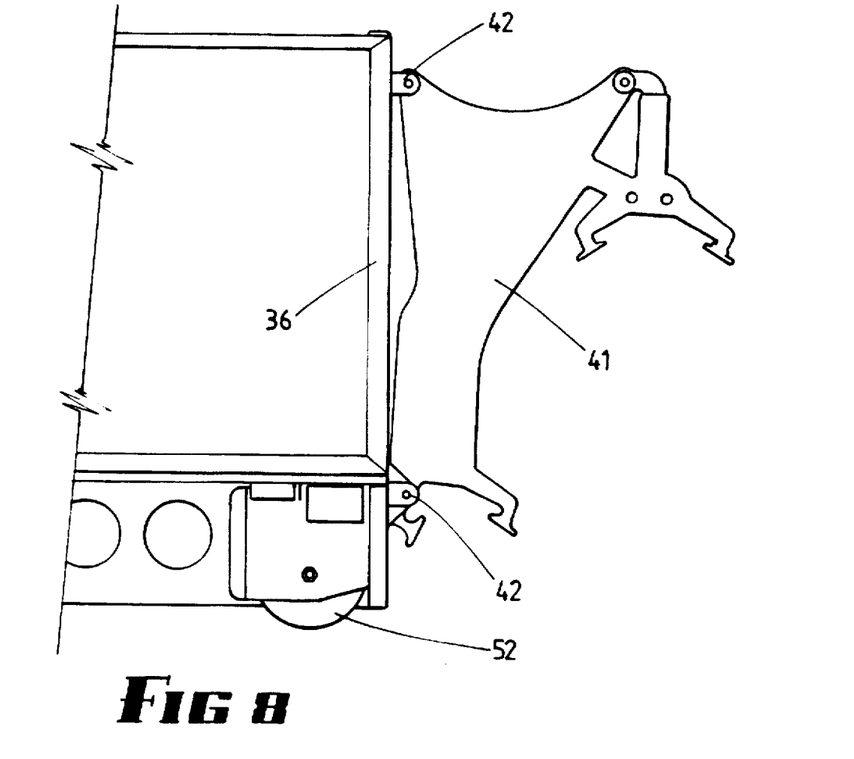
FIG. 8 is a fragmentary side elevational view of the pannier unit showing the attachment of a pylon to one of the end walls of the container chassis.

The end walls 15, 16 of the container 11 are provided with removable doors 36, 37 respectively, each of which is held in place by spring-loaded latches 38 fitted to the end walls 15, 16 adjacent opposite sides of the door 36, 37. As shown in FIGS. 7 and 8 of the drawings, each removable door 36, 37 has, in this embodiment, the facility to carry two conventional pylons 41 by means of latches 38 and bracketry 42 and 53 fitted thereto, the bracketry 42 and 53 having standard fittings for enabling the pylon 41 to be releasably fastened thereto. With this arrangement, some of the pylons can be removed from the upper well in the ceiling of the weapons bay of the aircraft and thereby provide additional space within the interior of the installed container 11, while still permitting a full complement of pylons to be carried within the aircraft.

Figure 1:
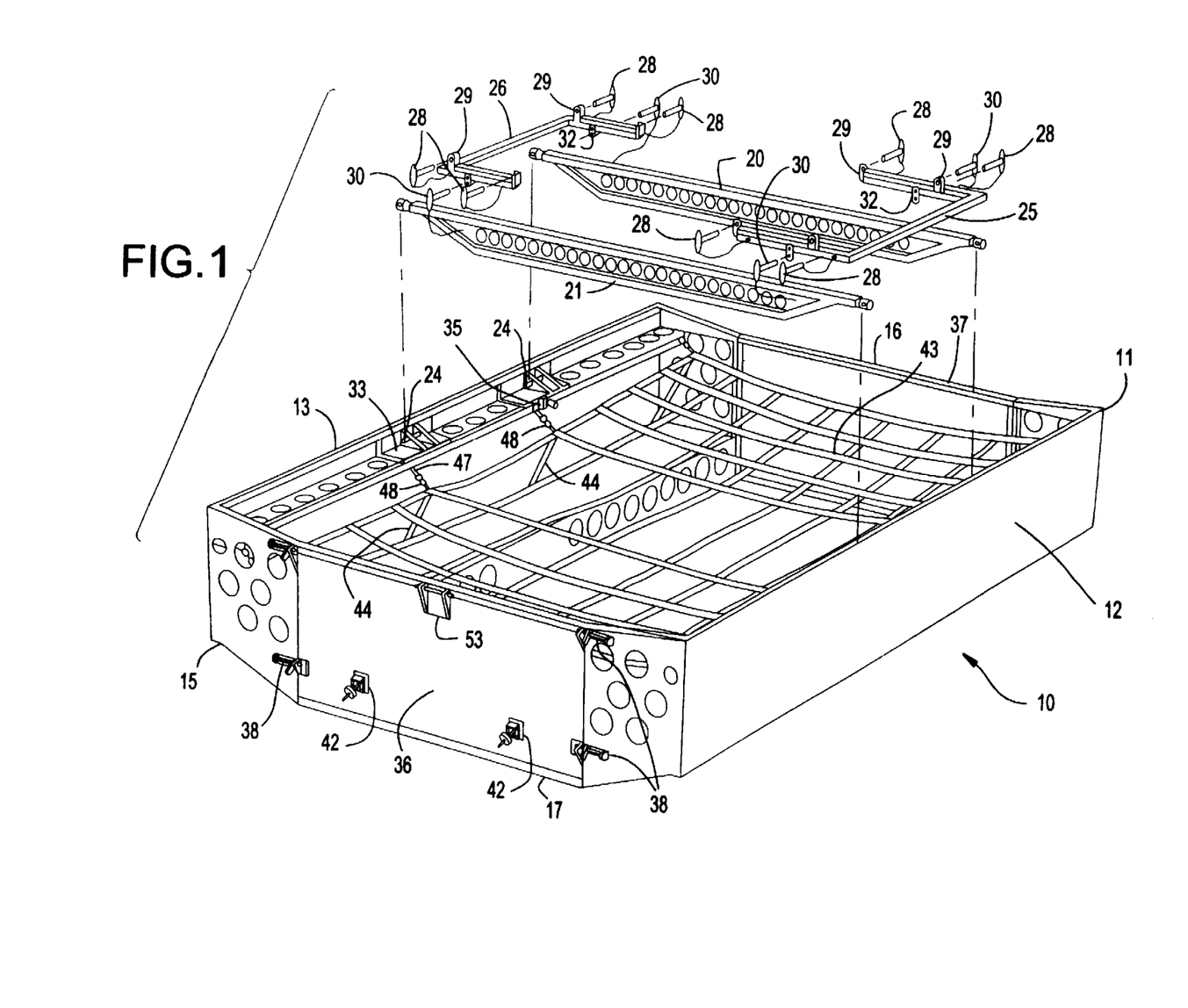
FIG. 1 is an "exploded" perspective view of the cargo pannier unit according to a preferred embodiment of the invention.
Figure 2:
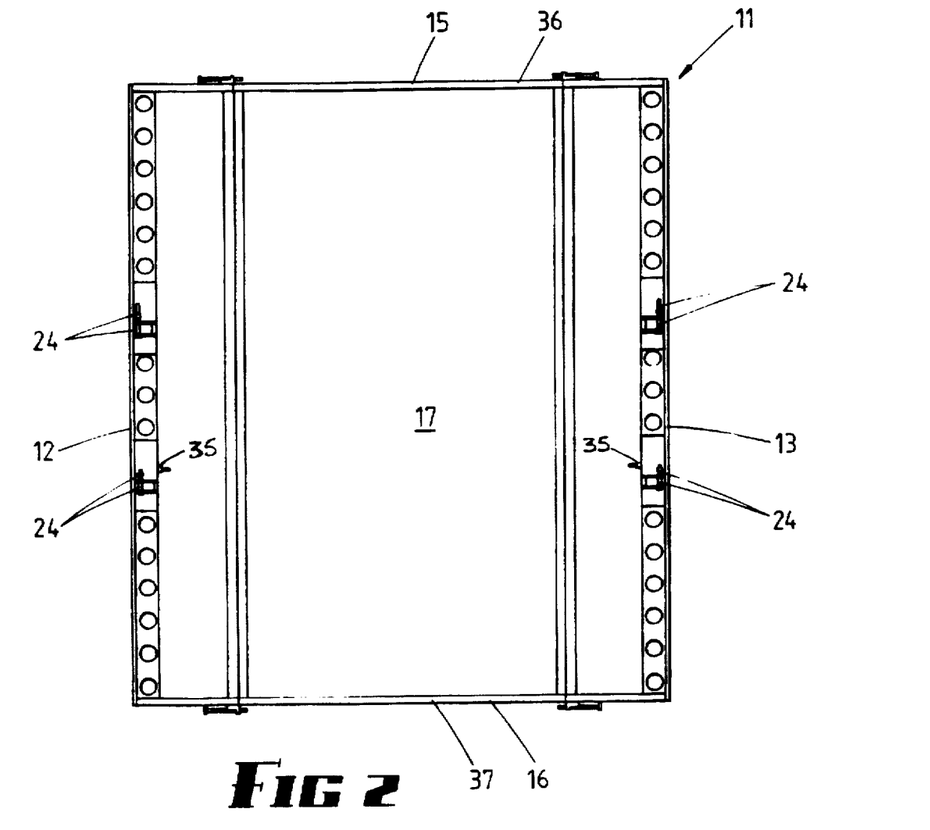
FIG. 2 is a plan view of the container chassis of the pannier, the suspension frame and the load restraining net having been omitted.
Figure 3:
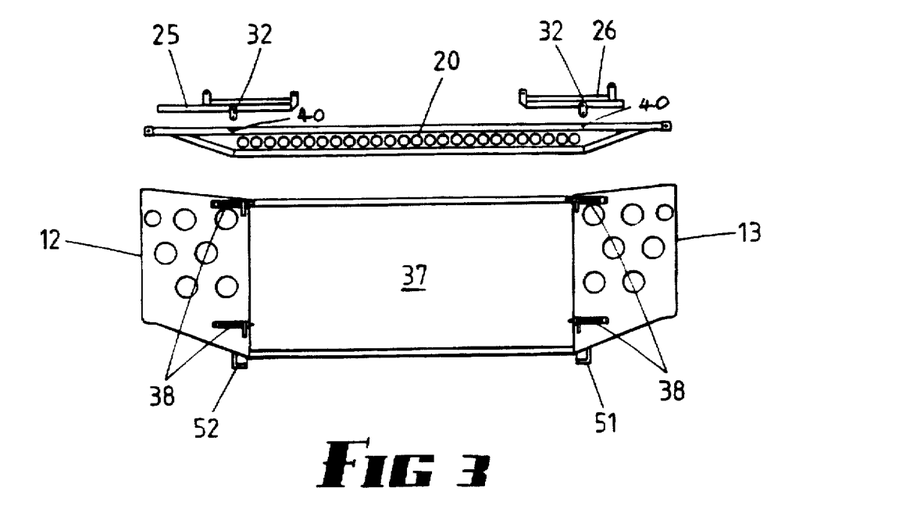
FIG. 3 is an "exploded" end elevational view of the pannier unit shown in FIG. 1.
Figure 4:
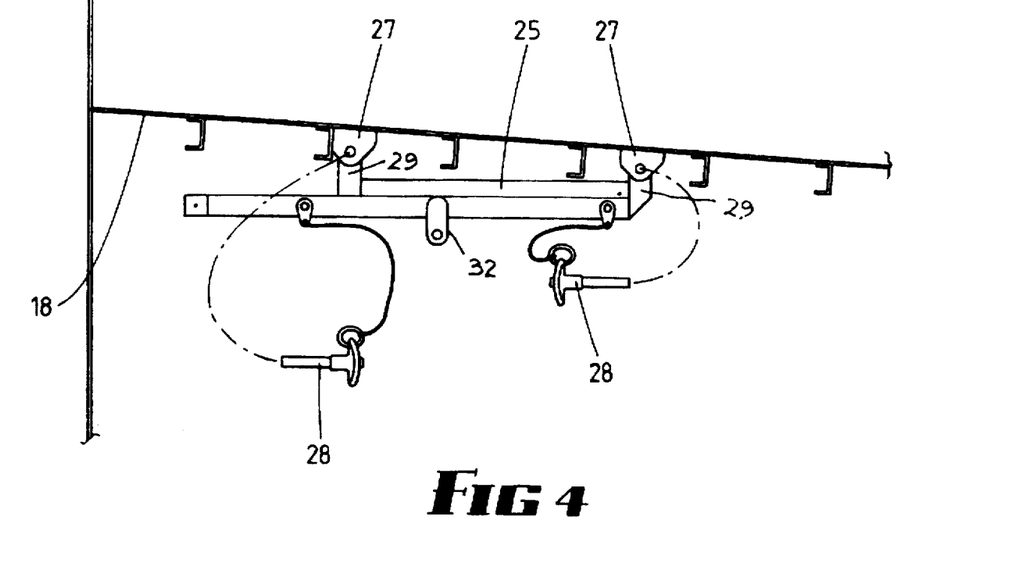
FIG. 4 is an end elevational view looking along the weapons bay of the aircraft in which the pannier unit is installed, showing the fitment of one of the top support frames to the store sway brace brackets which are provided at the front and rear of the pylon well of the aircraft.
Figure 5:
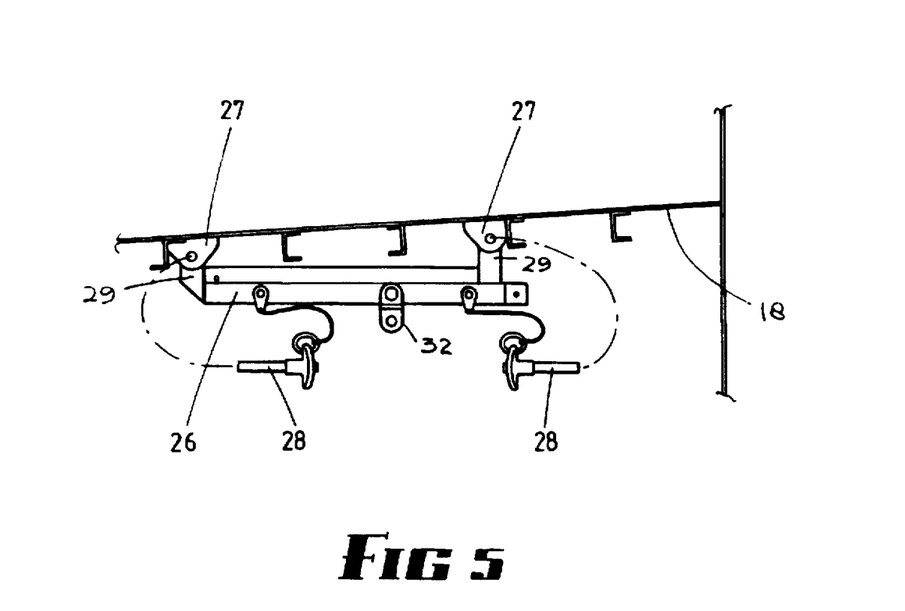
FIG. 5 is a view similar to FIG. 4 showing an end elevational view of the other top support frame attached in position.
Figure 9:
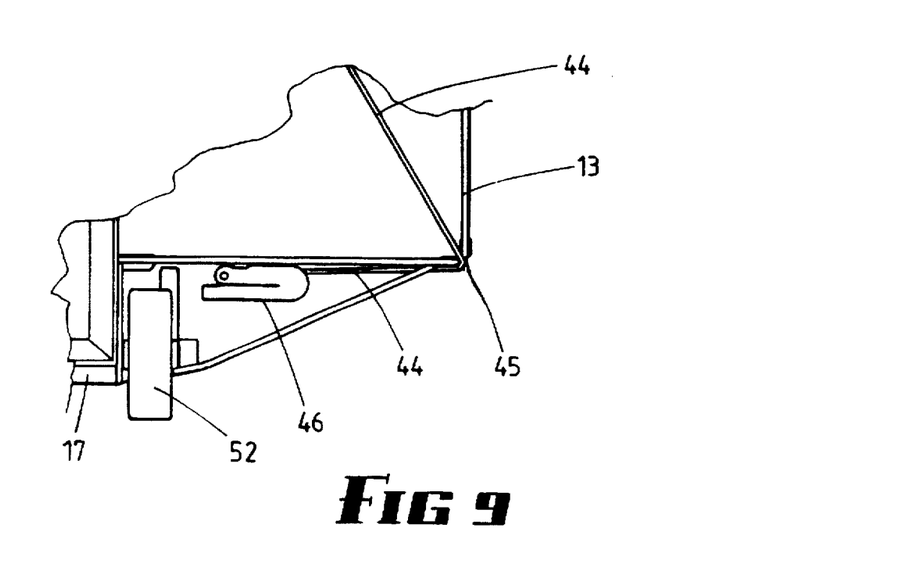
FIG. 9 is a fragmentary, partly sectioned view, showing the attachment of one of the straps of the cargo restraining net to an anchorage point on the underside of the chassis; whilst

As shown in FIG. 1, the container 11 is provided with an integral restraint system for securing cargo within the container 11, the restraint system comprising an approximately rectangular net 43 made of flexible webbing, the net 43 being held in place within the interior of the container 11 above the floor 17 thereof by means of a plurality of retention straps 44 spaced along opposite sides 12, 13 thereof, each strap 44 passing through a channel eyelet 45 (refer FIG. 9) located at the junction of the side and bottom walls of the container 11, and in turn attached to a ratchet buckle 46 secured to the underside of the container chassis 11. The buckles 46 allow the net 43 to be evenly tightened once the cargo is loaded within the container 11.

The net 43 is further supported by means of a series of shock cords 47 anchored to and spaced along the length of each of the side walls 12, 13 of the container 11, with each shock cord 47 being fastened by clips 48 to an attachment point at the side of the net. One function of the shock cords is to keep the cargo net 43 raised and out of the way for cargo loading, and preferably should remain this way even when no cargo is loaded.

In order to install the pannier assembly within the weapons bay of an Orion P3 aircraft, the following steps are performed. Firstly each of the sub-frames 25, 26 is attached to the sway brace retaining brackets or fittings 27 fitted to the weapons bay ceiling 18 by means of the releasable locking pins 28. With the support frames in position, the cross beams 20, 21 are then attached to the support frames 25, 26 by means of the releasable locking pins 30 (two for each cross beam)—refer FIG. 6.

The container 11 in an unladen condition, with both of its end doors 36, 37 removed from end walls 15, 16, and with the latches 35 in their retracted positions, is then lifted at its four lower corners by four personnel until it makes contact with underside surfaces of the cross beams at opposite ends thereof. The container 11 is then bodily moved horizontally in the lengthwise direction of the container in order to locate all four support pins 24 into the cross beam eye sockets 34. The latches 35 are then released and lock the cross beams 20, 21 in place. With the container 11 in its suspended position, the fore and aft doors 36, 37 are then refitted and the removed pylons (four in number) from the upper well in the ceiling of the weapons bay are attached two to each door 36, 37 on the outside thereof.

Following the loading of the container 11, the restraining net 43 is evenly tightened over the cargo by means of the ratchet buckles 46 and any loose strap ends are stowed away.

In order to remove the pannier assembly, the above-described procedure is simply reversed.

In accordance with known art, to assist in the ground handling of the pannier assembly 10, there is provided a non-castoring wheel 51 located centrally on each side, and a smaller non-castoring wheel 52 mounted on each side at opposite ends of the container 11. The wheels 51, 52 provide a means of manoeuvring the pannier on the ground and facilitate its positioning under the aircraft ready for manually lifting same into the weapons bay of the aircraft.

A brief consideration of the abovedescribed embodiment will indicate that the invention provides for a vastly improved aircraft cargo pannier system which is simple to install, easy to load, and the installation of which is independent of the weapons pylon system of the aircraft, thus obviating the need to reconfigure the pylons in the weapons bay each time the pannier is carried.

The claims defining the invention are as follows;

I claim:

1. An aircraft cargo and/or equipment pannier system for an aircraft having a weapons bay in its fuselage, said pannier system comprising:

a container chassis having a pair of opposite side walls, a pair of opposite end walls, a bottom wall and an open top, a pair of longitudinally spaced apart beam attachment mountings adjacent each of the side walls near the upper edge therof, the attachment mountings on one side of the chassis being transversely aligned with the corresponding attachment mountings on the other side, a pair of longitudinally spaced apart rigid cross beams, each extending between and having its opposite ends respectively releasably attached by connection means to said mountings, said cross beams, when thus attached, being housed essentially within the confines of the container chassis, an upper support frame assembly, mutually spaced apart attachment means on said support frame assembly for releasably securing the support frame assembly at spaced apart fastening points to the ceiling of the weapons bay of the aircraft, and releasable securing means for releasably securing the support frame assembly at mutually spaced locations to said cross beams near opposite ends of each said cross beam.

2. A pannier system according to claim 1 wherein said upper support frame assembly comprises a pair of bridging frame members which bridge said cross beams near opposite ends thereof.

3. A pannier system according to claim 2 wherein said support frame assembly comprises a pair of separate sub-frames each having said bridging frame member and at each end thereof a pair of parallel spaced apart end frame members each extending at right angles to said bridging frame member inwardly therefrom, said sub-frames being arranged, one to either side of the central longitudinal vertical plane of the container chassis, with the end frame members of each said sub-frame respectively lying contiguous with and parallel to said cross beams, with the bridging frame member extending therebetween.

4. A pannier system according to claim 3 wherein each said sub-frame is U-shaped (in plan), and wherein said attachment means comprises four upstanding attachment lugs, two of which are located at or near the outer corners of the sub-frame, the other two of which are located at the free inner ends of said end frame members.

5. A pannier system according to claim 3 or wherein each said releasable securing means comprises a pair of releasable locking pins, each of which engages within aligned apertures formed respectively in a depending lug carried by the sub-frame and the cross beam near its upper edge.

6. A pannier system according to claim 1 wherein each said beam attachment mounting comprises a fixed locating pin which extends approximately longitudinally of the chassis, each said locating pin slidably engaging within a through-opening or hole formed adjacent the end of said cross beam.

7. A pannier system according to claim 3 wherein said securing means comprise a first set of locking pins tethered to said cross beams, and said attachment means comprise a second set of locking pins tethered to said sub-frames.

8. A pannier system according to claim 1 further comprising a pair of opposite transversely aligned manually operable releasable latch devices carried inboard of said side walls for releasably retaining one of the cross beams fast with said container chassis.

9. A pannier system according to claim 1 wherein each said end wall of the container chassis comprises pylon attachment means on the outside thereof for releasably attaching one or more pylons thereto.

10. A pannier system according to claim 9 wherein each said end wall comprises a removable door section, each said door section carrying said pylon attachment means.

11. A pannier system according to claim 1 further comprising a cargo restraining net formed of flexible webbing removably supported within the container chassis above its floor.

12. A pannier system according to claim 11 wherein said cargo restraining net comprises a plurality of net tightening strap portions spaced along each of the opposite longitudinal margins of the net, said strap portions passing through openings spaced along the length of each said side wall at or near its lower edge, said strap portions being anchored to respective anchorage means fixed on the underside of the chassis, said net being further provided with a plurality of clips spaced around its periphery for releasable connection to anchorage points spaced along the length of the side walls near the upper edges thereof.

13. A pannier system according to claim 12 wherein each said anchorage means comprises a ratchet buckle.

14. A pannier system according to claim 12 wherein each said clip co-operates with a clip engaging member carried at an end of a short length of shock cord which connects to a said anchorage point.

15. A pannier system according to claim 8 wherein each said manually operable releasable latch device comprises a vertical abutment pin movable between an extended position wherein it abuts against a side surface of the cross beam and a retracted position wherein it lies clear of the cross beam to thereby permit the beam to slidably disengage from its locating pins.

16. A suspension system for suspending an aircraft cargo and/or equipment pannier comprising a container chassis having a pair of opposite side walls, a pair of opposite end walls, a bottom wall and an open top, from the ceiling of the weapons bay of the aircraft via the aircraft's store sway brace brackets, said suspension system comprising;

a cross beam assembly arranged to extend between the opposite side walls of the container chassis, releasable connection means for releasably attaching said cross beam assembly to respective mountings adjacent said side walls of the chassis near the upper edges thereof, said cross beam assembly when thus attached, being housed essentially within the confines of the container chassis, an upper support frame assembly, mutually spaced apart attachment means on said support frame assembly for releasably securing the support frame assembly respectively to said sway brace brackets in the ceiling of the weapons bay of the aircraft, and releasable securing means for releasably securing said support frame assembly to said cross beam assembly.

17. A suspension system according to claim 16 wherein said releasable securing means comprise locking pins.

18. A suspension system according to claim 16 wherein said cross beam assembly comprises a pair of spaced apart parallel rigid cross beams, each extending between and having its opposite ends releasably attached by said connection means to said mountings.

19. A suspension system according to claim 18 wherein said upper support frame assembly comprises a pair of separate sub-frames each having a bridging frame member extending between said cross beams near a respective side of the container chassis and a pair of parallel spaced apart end frame members each extending at right angles to said bridging frame member inwardly therefrom, said sub-frames being arranged, one to either side of the central longitudinal vertical plane of the container chassis, with the end frame members of each said sub-frame respectively lying contiguous with and parallel to said cross beams.

20. A suspension system according to claim 19 wherein each said sub-frame is U-shaped (in plan) and wherein said attachment means comprise four upstanding apertured lugs, two of which are located at or near the outer corners of the sub-frame, the other two of which are located at the free ends of said end frame members, and removable locking pins which pass through said lugs and said sway brace brackets.

21. A suspension system according to claim 20 wherein said releasable locking pins are tethered to said sub-frames.

22. A suspension system according to claim 18 wherein each said cross beam is provided with a pin receiving hole at each of its opposite ends, each said hole slidably locating over a fixed mounting pin located adjacent a respective said container chassis side wall near its upper edge.

* * * * *

UNITED STATES PATENT AND TRADEMARK OFFICE
CERTIFICATE OF CORRECTION

PATENT NO. : 5,775,641
DATED : July 7, 1998
INVENTOR(S) : Peter Goon

It is certified that error appears in the above-identified patent and that said Letters Patent is hereby corrected as shown below:

Title page, item [73], Assignee should read --The Commonwealth of Australia, Australia--.

Signed and Sealed this

Twenty-fourth Day of August, 1999

Attest:

Q. TODD DICKINSON

*Attesting Officer*     *Acting Commissioner of Patents and Trademarks*